United States Patent
Anderson

[19]

[11] Patent Number: 6,002,436
[45] Date of Patent: Dec. 14, 1999

[54] METHOD AND SYSTEM FOR AUTO WAKE-UP FOR TIME LAPSE IMAGE CAPTURE IN AN IMAGE CAPTURE UNIT

[75] Inventor: Eric C. Anderson, San Jose, Calif.

[73] Assignee: FlashPoint Technology, Inc., San Jose, Calif.

[21] Appl. No.: 08/920,140

[22] Filed: Aug. 28, 1997

[51] Int. Cl.[6] .................................................. H04N 5/232
[52] U.S. Cl. .......................... 348/372; 396/263; 396/302
[58] Field of Search .................................. 348/220, 372, 348/222; 396/263, 302, 265, 502

[56] References Cited

U.S. PATENT DOCUMENTS

| | | | |
|---|---|---|---|
| 4,466,721 | 8/1984 | Detuzzi | 396/265 |
| 5,162,839 | 11/1992 | Wakabayashi et al. | 396/302 |
| 5,345,288 | 9/1994 | Kobayashi et al. | 396/263 |
| 5,541,656 | 7/1996 | Kare et al. | 348/334 |
| 5,541,707 | 7/1996 | Sasagaki et al. | 396/302 |
| 5,708,882 | 1/1998 | Yokonuma et al. | 396/302 |

*Primary Examiner*—Wendy Garber
*Assistant Examiner*—Mitchell White
*Attorney, Agent, or Firm*—Sawyer & Associates

[57] ABSTRACT

The present invention provides a system and method for timelapse capture in an image capture unit. A system and method for timelapse capture according to the present invention comprises capturing a first image automatically; initiating a sleep mode after capturing the first image; and transitioning from the sleep mode into a wake mode prior to capturing a second image. According to the present invention, a system and method is provided which provides a digital camera with the ability to automatically place the digital camera in a sleep mode during the interval when the camera is inactive. The sleep mode minimizes power consumption during inactive periods of a timelapse capture sequence, thus allowing automation of timelapse sequences. The sleep mode can be initiated if a predetermined time interval is greater than a setup time required prior to initiating the next image capture. The predetermined time interval can be an interval such as a time interval which starts after the end of the processing time required for a first capture and continuing until the second image capture.

22 Claims, 9 Drawing Sheets

METHOD AND SYSTEM FOR AUTO WAKE-UP FOR TIME LAPSE IMAGE CAPTURE IN AN IMAGE CAPTURE UNIT

CROSS-REFERENCE TO RELATED APPLICATION

This application is related to U.S. Ser. No. 08/918,816, entitled "Method and System of Organizing DMA Transfers to Support Image Rotation." This application is related to U.S. Ser. No. 08/795,587 entitled "Apparatus and Method for Camera Image and Orientation Capture," filed Feb. 6, 1997, which is a continuation of U.S. Ser. No. 08/384,012 (abandoned), entitled "Apparatus and Method for Orientation-Dependent Camera Exposure and Focus Setting Optimization". Both applications are assigned to the same assignee as the instant application.

FIELD OF THE INVENTION

The present invention relates generally to digital image capture units, and more particularly to a method and system for timelapse capture in digital cameras.

BACKGROUND OF THE INVENTION

Most digital cameras today are similar in size to and behave like conventional point-and-shoot cameras. Unlike conventional cameras, however, most digital cameras store digital images in an internal flash memory or on external memory cards, and some are equipped with a liquid-crystal display (LCD) screen on the back of the camera. Through the use of the LCD, most digital cameras operate in two modes, record and play, although some only have a record mode. In record mode, the LCD is used as a viewfinder in which the user may view an object or scene before taking a picture. In play mode, the LCD is used as a playback screen for allowing the user to review previously captured images either individually or in arrays of four, nine, or sixteen images.

One option for which a digital camera can be used is for capturing timelapse images. Timelapse images typically capture a series of images over a period of time. For example, a digital camera can capture various stages of a rose as it blooms. The user can estimate how long it might take the rose to bloom, and capture the image of the rose at periodic intervals during that time. Another example of timelapse image capture is timelapse captures of the growth of a stalk of corn. In this instance, the user may choose to capture one or two images per day over several days.

Conventional digital cameras typically have no automatic features for timelapse due to the short life of the battery which is commonly used in the digital cameras. In live view mode, battery life typically only lasts 15 to 20 minutes. Thus, the short battery life limits a timelapse series of image captures to only 15 to 20 minutes, a time which is far too short for most timelapse captures.

What is needed is an automatic timelapse capture in an image capture unit, such as a digital camera. The present invention addresses such a need.

SUMMARY OF THE INVENTION

The present invention provides a system and method for timelapse capture in an image capture unit. A system and method for timelapse capture according to the present invention comprises capturing a first image automatically; initiating a sleep mode after capturing the first image; and transitioning from the sleep mode into a wake mode prior to capturing a second image.

According to the present invention, a system and method is provided which provides a digital camera with the ability to automatically place the digital camera in a sleep mode during the interval when the camera is inactive. The sleep mode minimizes power consumption during inactive periods of a timelapse capture sequence, thus allowing automation of timelapse sequences. The sleep mode can be initiated if a predetermined time interval is greater than a setup time required prior to initiating the next image capture. The predetermined time interval can be an interval such as a time interval which starts after the end of the processing time required for a first capture and continuing until the second image capture.

DETAILED DESCRIPTION OF THE INVENTION

The present invention relates to a system and method for automatic timelapse capture in an image capture unit. The following description is presented to enable one of ordinary skill in the arts to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any image capture device could incorporate the features described hereinbelow and that device would be within the spirit and scope of the present invention. Thus, the present invention is not intended to be limited to the embodiment shown, but is to be accorded the widest scope consistent with the principles and features described herein.

The present invention is a system and method for timelapse capture which minimizes power consumption in an image capture unit. According to the present invention, a system and method is provided which provides a digital camera with the ability to automatically place the digital camera in a sleep mode during the interval when the camera is inactive. The sleep mode minimizes power consumption during inactive periods of a timelapse capture sequence, thus allowing automation of timelapse sequences. The sleep mode can be initiated if a predetermined time interval is greater than a setup time required prior to initiating the next image capture. The predetermined time interval can be an interval such as a time interval which starts after the end of the processing time required for a first capture and continuing until the second image capture.

In operation, a user may set up a digital camera for a timelapse sequence. While setting up the digital camera, the user can indicate a time interval between image captures. After the first image is captured, the digital camera can transition into sleep mode, which minimizes power consumption. Thereafter, the camera can transition from sleep mode into a wake mode prior to the second image capture. Accordingly, the timelapse capture series can be made automatic without unnecessary consumption of battery power.

Figure 1:
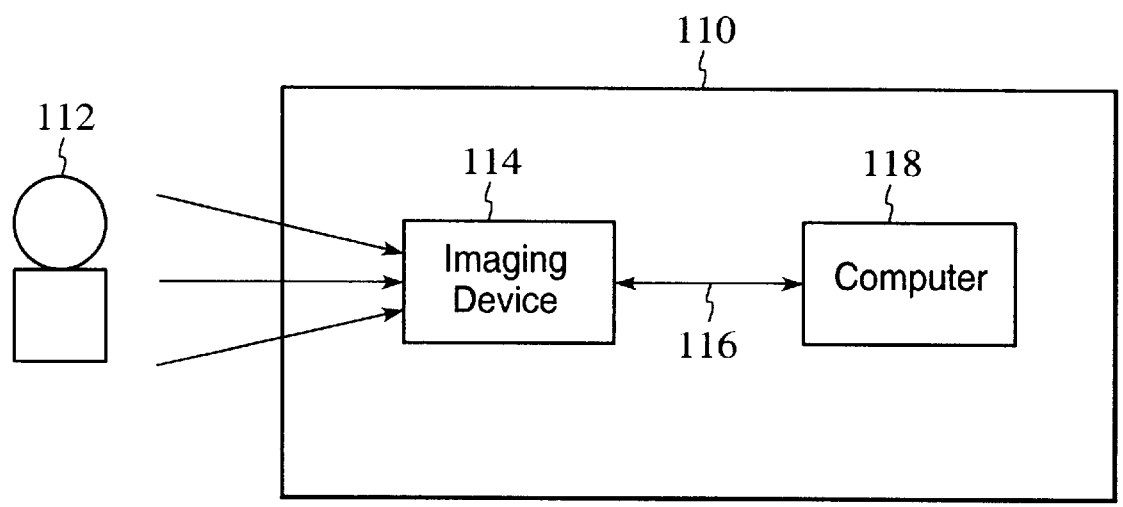
FIG. 1 is a block diagram of a digital camera in which the present invention can reside.

Referring now to FIG. 1, a block diagram of a digital camera 110 is shown according to the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
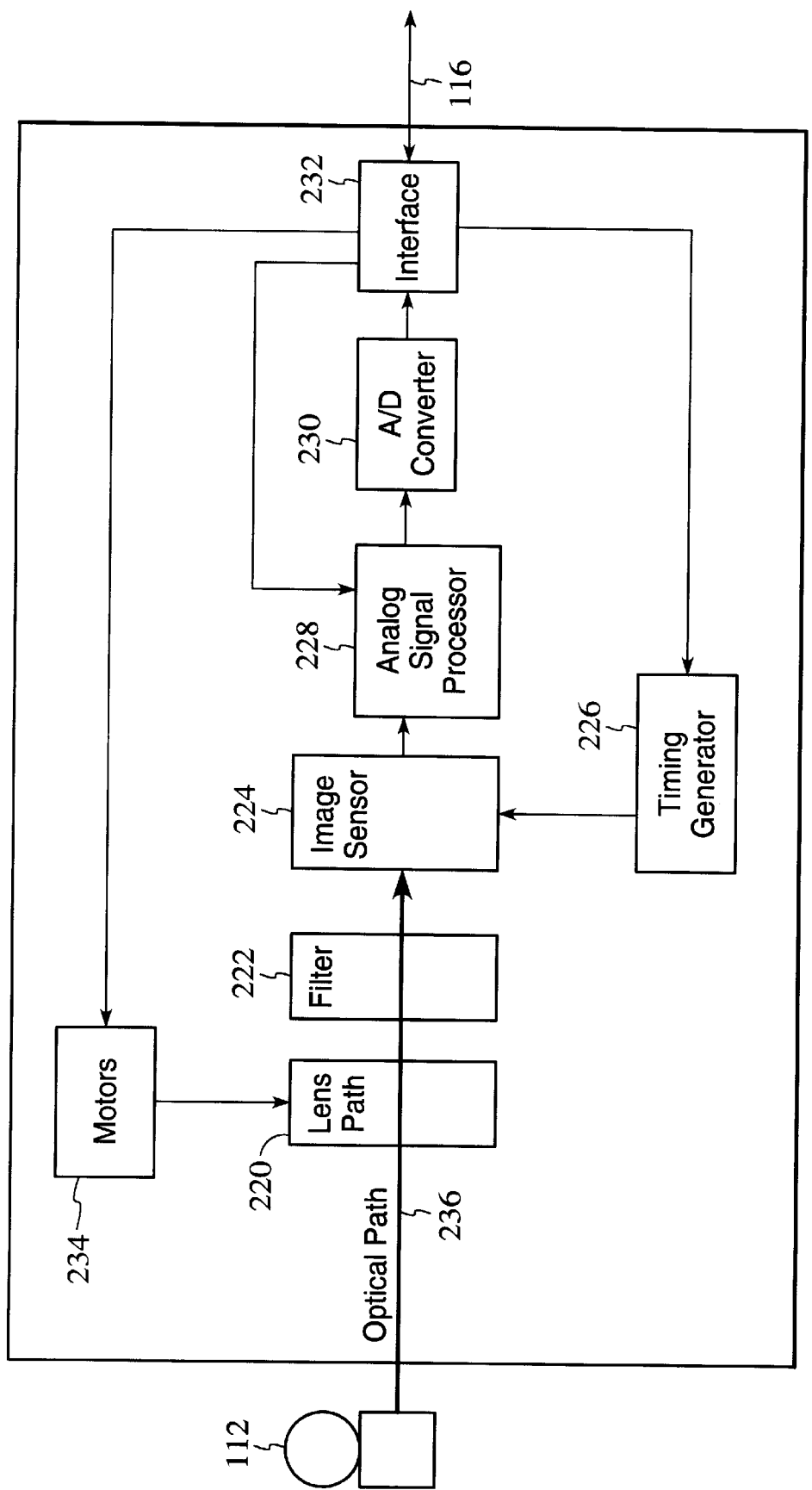
FIG. 2 is a block diagram of an example of an imaging device of FIG. 1.

Referring now to FIG. 2, a block diagram of an example of an imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motors 234.

Imaging device 114 captures an image of object 112 via reflected light impacting image sensor 224 along optical path 236. Image sensor 224, which is preferably a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
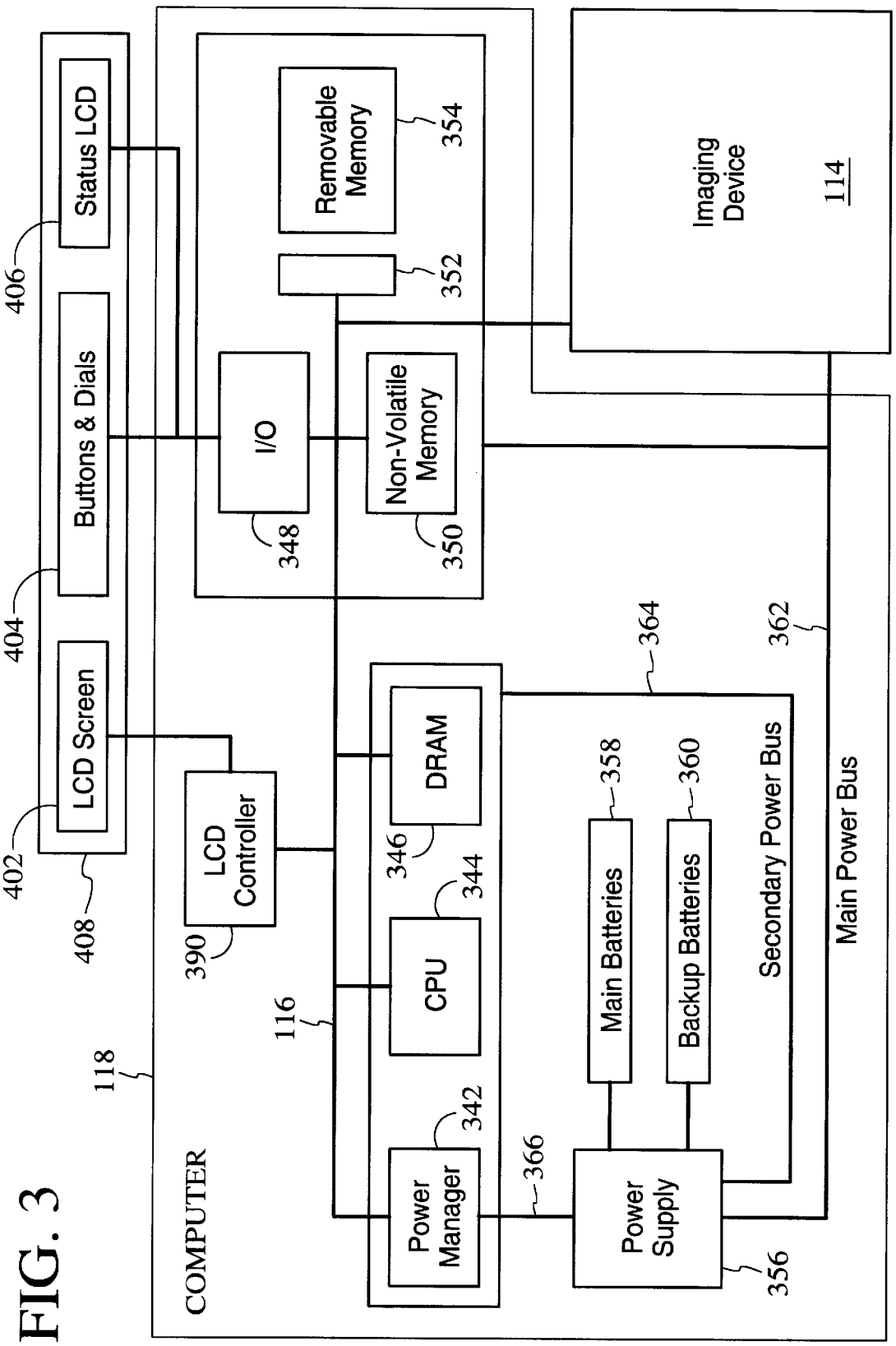
FIG. 3 is a block diagram of an example of the computer of FIG. 1.

Referring now to FIG. 3, a block diagram of an example of computer 118 is shown. System bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. Removable memory 354 can be implemented by using a flash disk.

Power supply 356 supplies operating power to the various components of camera 110. The power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 4:
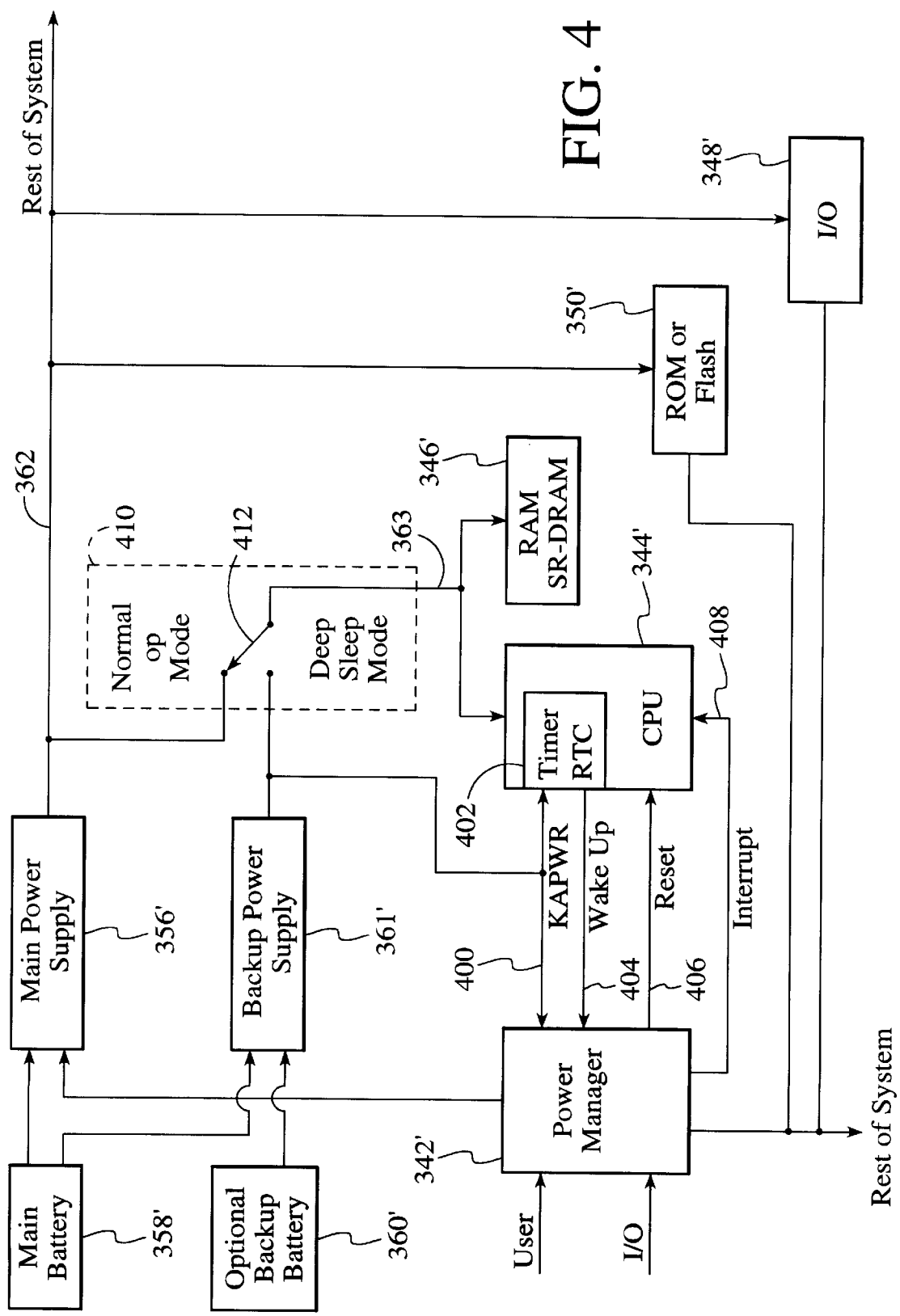
FIG. 4 is a block diagram of a modification of the example of the computer shown in FIG. 3 in which the present invention can reside.

FIG. 4 is a block diagram showing further details of the general block diagram of the computer system shown in FIG. 3 according to the present invention. The system of FIG. 4 includes a main battery 358' working in conjunction with a main power supply 356'. An optional backup battery 360' can also be included to work in conjunction with a backup power supply 361'. A power manager 342' works in conjunction with the main power supply 356'. The power manager 342' is coupled to the CPU 344' and is supplied with power by the backup supply.

A timer or a real time clock (RTC) 402 is shown included in the CPU 344'. Alternatively, the timer 402 can be included in the power manager 342'. The RAM 346', the ROM or flash memory 350', and the input/output (I/O) 348' are also shown to be included within the system of FIG. 4. The remaining system is unchanged from that shown in FIG. 3.

Various signals are communicated between the timer 402 and the power manager 342'. For instance, the system of FIG. 4 is shown to have keep alive power (KAPWR) 400 from the backup supply and a wakeup signal 404 communicating between the timer 402 and the power manager 342'. The KAPWR signal is a power input to keep the real time clock running. A reset signal 406 and an interrupt signal 408 are also shown to be communicated between the power manager 342' and the CPU 344'.

The system according to the present invention also permits the option of having a normal operation mode or a sleep mode, as shown by area 410. Area 410 includes a switch 412 which can switch between normal operation mode and sleep mode. The switch 412 is an electrical switch and is controlled by the power manager 342'. The electrical switch 412 can be, for example, a dual back-to-back field effect transistor (FET) between the main power bus 362 on the backup power bus 363. Sleep mode, as meant herein, generally refers to any mode which utilizes less than full battery power, but preferably utilizes the battery power such that the averaged power throughout the timelapse sequence is minimized.

Figure 5:
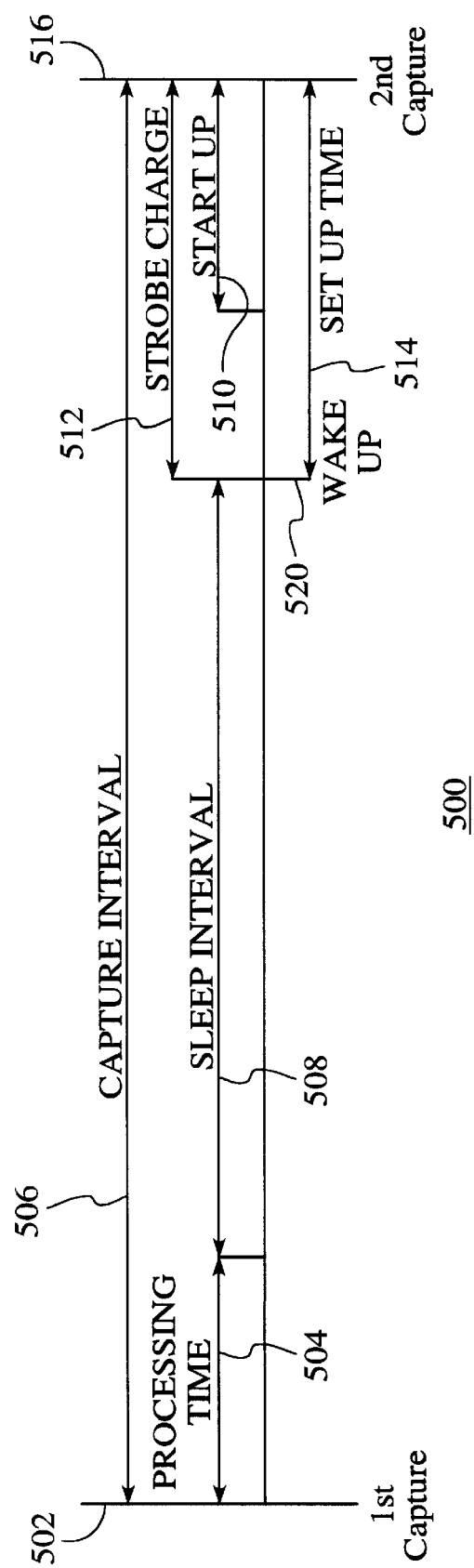
FIG. 5 is a timeline illustrating events occurring between the first capture and the second capture in a method for automatic timelapse capture according to the present invention.

FIG. 5 is a timing diagram of events occurring between a first image capture and a second image capture. In this timing diagram 500, a first image capture is taken at 502. Thereafter, the first image is processed during processing time 504. The processing time 504 is expected to range approximately 0.5–2.0 seconds for a hardware based camera and 2–30 seconds for a software based camera. A capture interval 506 is the time interval between two consecutive image captures. Within the capture interval 506, the processing time 504, a sleep interval 508 and a setup time 514 are included. The sleep interval 508 and the setup time 514 are separated by the wakeup event 520. The setup time 514 can be a compilation of various other times such as startup time 510 and strobe charge time 512. Note the strobe charge time 512 is optional depending on whether a strobe is used for capture. Additionally, the strobe charge time 512 and the startup time 510 can occur simultaneously. Since strobe charge time 512 will typically be longer than the startup time 510, it is preferable for the strobe charge time 512 to begin before the startup time 510 is initiated. The strobe charge time 512 (i.e., the time for the strobe to charge) can range approximately 2–8 seconds. Often, the strobe charge time 512 may be unnecessary since a strobe may not be used. When a strobe is not used, then only the startup time 510 will be initiated. The various time intervals depend on factory settings and can vary widely.

One way of reducing power during a time lapse image capture sequence is to shut off all circuitry related to capturing after an image has been captured until the initiation of the next setup time. Additionally, the setting of the image camera lenses can simply remain the same as when the camera is set for the first image. For example, in an image capture unit which withdraws its lenses when the image capture unit is shut off, during sleep mode lenses would remain in the same position as they are in capture mode.

Figure 6:
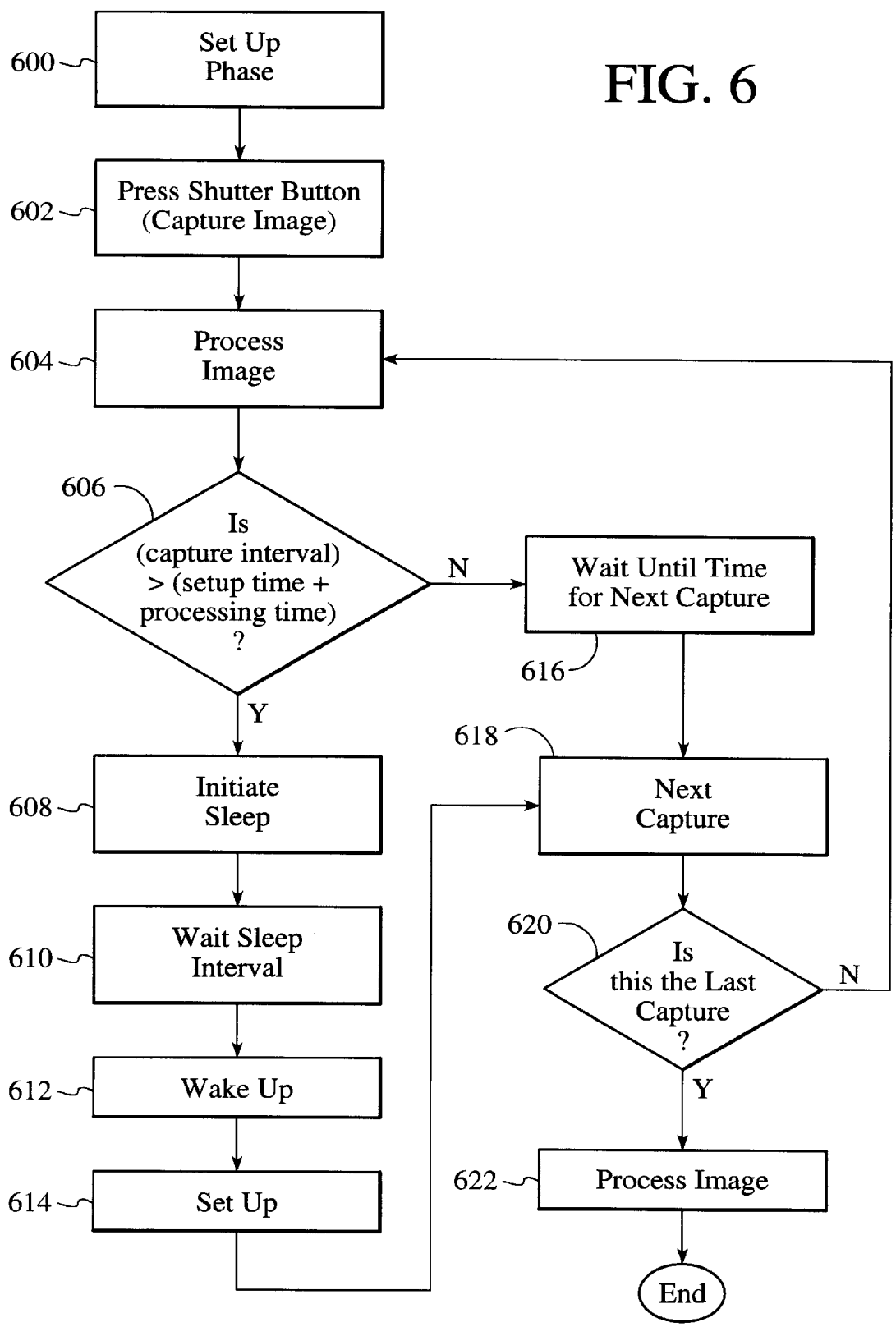
FIG. 6 is a flow diagram of the method for automatic timelapse capture according to the present invention.

FIG. 6 is a flow diagram of a method for automatic timelapse capture in an image capture unit according to the present invention. The method of FIG. 6 can be viewed in light of the timeline 500 of FIG. 5. The method of FIG. 6 initiates with a setup phase 600. During the setup phase, the user can establish information regarding the timelapse capture series, such as the image count, the capture interval, explicit/implicit lock, determine strobe or flash, and physical setup of the digital camera. The image count is a determination of how many total number of images the digital camera should take during the timelapse series. A capture interval is the time interval between two consecutive image captures. Explicit/implicit lock relates to a determination of whether the exposure is locked, i.e., whether the digital camera adjusts to changes in the light. The physical setup can include placing the digital camera upon a tripod, pointed in the desired angle at the object.

The shutter button can then be pressed, via step 602. Usually, pressing the shutter button will initiate the first image capture. The image is then processed, via step 604. It is then determined whether the capture interval is greater than the sum of the setup time and the processing time, via step 606. The capture interval 506, the processing time 504, and the setup time 514 are shown in FIG. 5.

If the capture interval 506 is not greater than the sum of the processing time 504 and the setup time 514, via step 606 of FIG. 6, then the digital camera system waits until time for the next image capture, via step 616. If, however, the capture interval 506 is greater than the setup time 514, via step 606, then sleep mode is initiated via step 608. The term "sleep mode", as before mentioned, is herein referred to mean any state which utilizes less than full power. For example, the Motorola processor MTC823 utilizes terms indicating ranges of required power. These terms include full, doze, sleep, deep sleep, power down, and power off. These terms are listed in the order of higher power required to lower power required. The lower the power, the longer and more complex the start/stop routine of the system. Although processors, such as the Motorola processor MTC823, provide power management capability in the hardware, the power management capability had not been utilized in working in conjunction with time lapse image capturing in image capture units such as digital cameras because external circuitry, such as for the power manager, and complex software are required to do so.

Again, anything less than full power is generally referred to herein as "sleep mode". The preferred state of sleep mode is either deep sleep or power down, depending on software and hardware capacities. "Power down" implies all power being off except for the realtime clock, some startup circuitry, and power up circuitry, depending on the chip manufacturer. If the digital camera system 10 reduces power to the "power off" state, however, the system may have to be rebooted which consumes power. Reducing power to deep sleep, however, does not require a reboot of the digital camera. Examples of how long it would take to wake up from a sleep state may be 5 seconds to wake up from a power down, and 0.5 seconds to wake up from deep sleep. Although deep sleep continuously draws power, the typical timelapse selected between image captures is short enough to make it efficient to avoid rebooting.

If the capture interval 506 is greater than the sum of the processing time 504 and the setup time 514, via step 606 of FIG. 6, sleep is initiated via step 608. After sleep has been initiated, there is a waiting period which is equivalent to the sleep interval 508 (FIG. 5), via step 610. After the sleep interval 508, the digital camera system wakes up, via step 612. After waking up, the digital camera system sets up for the next capture, via step 614. The next capture is then taken, via step 618. It is then determined if the capture taken in step 618 was the last capture, via step 620. If the capture was not the last capture, then the image is processed via step 604 and it is determined if the capture interval is greater than the setup time, via step 606. If, however, the capture of step 618 was the last capture, then the image is processed via step 622 and the sequence is ended.

Figure 7:
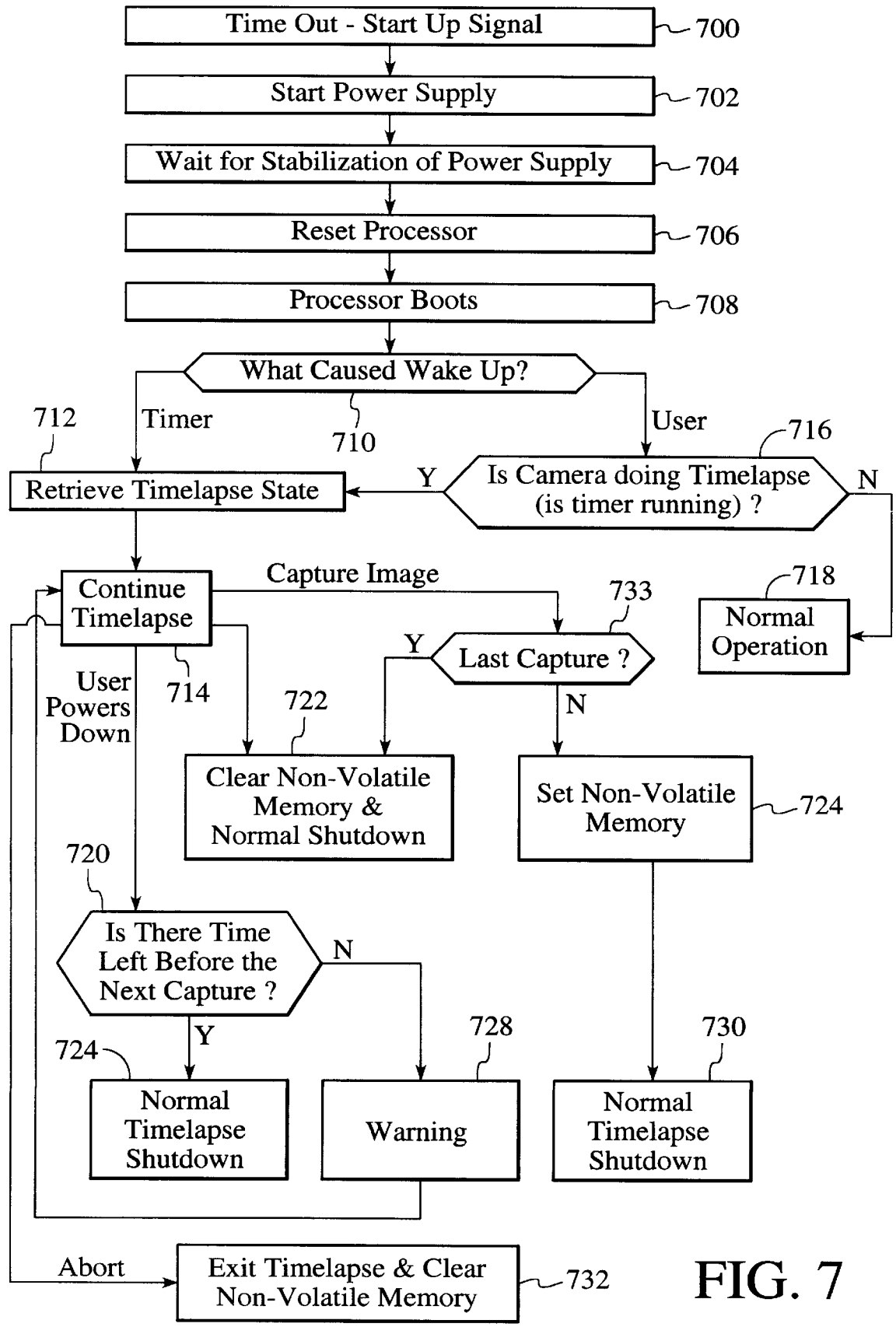
FIG. 7 is a more detailed flow diagram of an embodiment embodying steps 612–622 of the method according to the present invention shown in FIG. 6.

FIG. 7 is a more detailed flow diagram of an embodiment of the automatic timelapse capture which occurs between wake-up (step 612) and image processing (step 622) of FIG. 6. Wake-up is initiated when a timeout-startup signal is received via step 700 from the timer 402 shown in FIG. 4. The power supply is started, via step 702. The system then waits for the stabilization of the power supply, via step 704. The processor is reset via step 706, and the processor boots via step 708. It is then determined what caused the wakeup, via step 710. If something other than the timer, such as the user, caused the wakeup, it is then determined whether the digital camera is in the middle of performing a timelapse sequence, via step 716. Step 716 can be determined by determining whether the timer is running. If a timelapse sequence is not being performed, then normal operations can proceed. If, however, a timelapse sequence is being performed, then the timelapse state is retrieved, via step 712.

Likewise, if the timer caused the wakeup via step 710, then the timelapse state is retrieved, via step 712. The timelapse is then continued, via step 714. Once an image is captured, and it is determined that that capture is not the last image via step 733, then a nonvolatile memory is set, via step 724. The nonvolatile memory is set to store information regarding the time lapse capture series. The information can include, for example, how many images have been taken in the series, how many images are yet to be taken, what is the time interval, location where images in a series are to be stored, and all camera settings. After the nonvolatile memory is set then a normal timelapse shutdown is performed, via step 730, i.e., sleep is initiated.

If the last image is captured, via step 733, and the processing is complete, then the nonvolatile memory is cleared and normal shutdown is performed, via step 722. Normal shutdown can include a period of sleep mode followed by power-off, or simply power-off.

If the digital camera is powered down by the user, then it is determined whether there is enough time left before the next capture, via step 720. If there is not time left before the next capture to sleep, then a warning is displayed for the user via step 728 and step 714 continues. Note that the user can abort the time-lapse sequence during step 714. Otherwise, the timelapse program is shut down via step 724.

If it is determined to abort the timelapse sequence, then timelapse sequence is exited and non-volatile memory is cleared via step 732.

Figure 8:
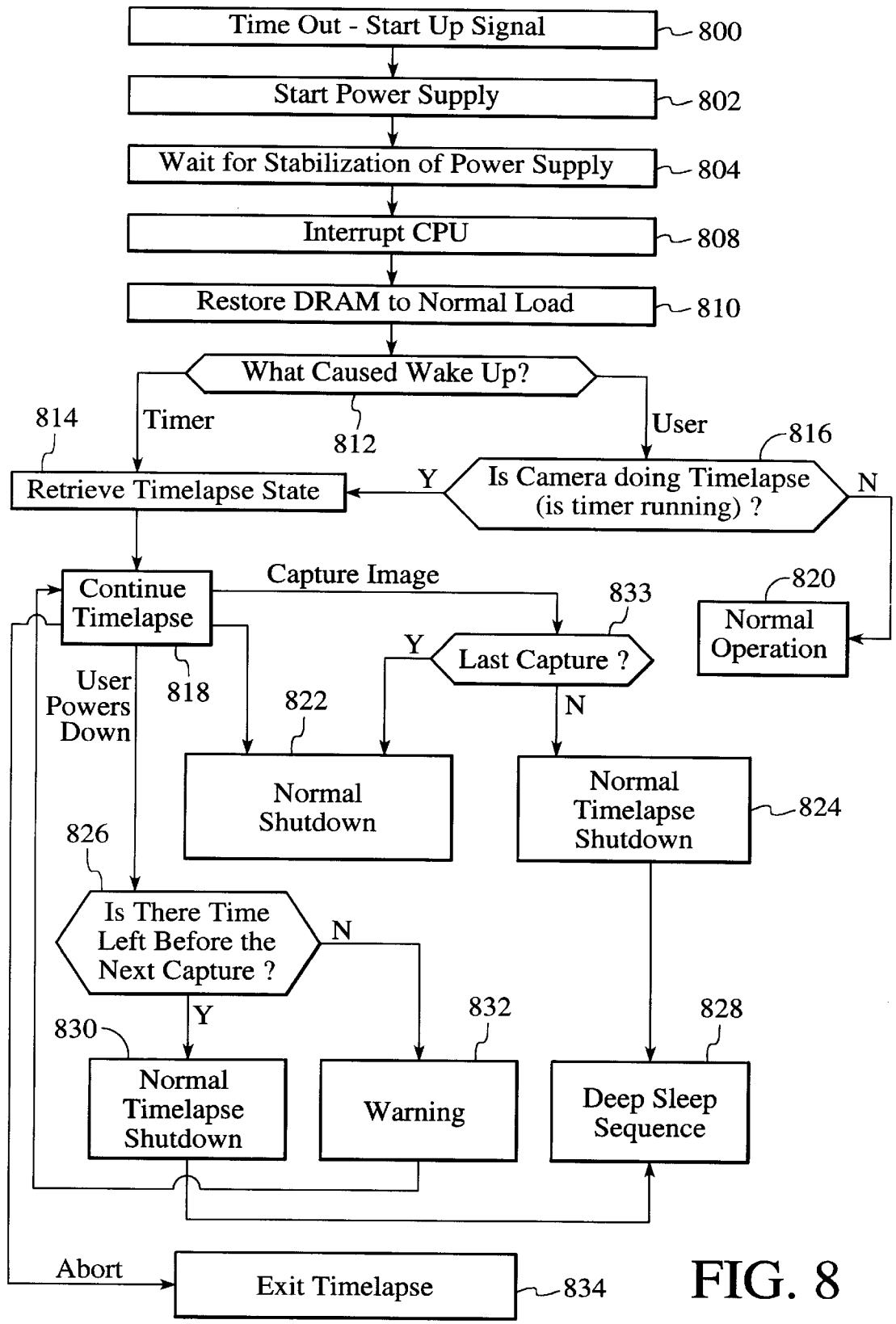
FIG. 8 is a more detailed flow diagram of another embodiment embodying steps 612–622 of the method according to the present invention shown in FIG. 6.

FIG. 8 is a detailed flow diagram of another embodiment embodying the steps of 612–622 shown in FIG. 6. While the embodiment shown in FIG. 7 boots the processor, the embodiment shown in FIG. 8 simply interrupts the CPU. Wake-up is initiated when a timeout-startup signal is received via step 800 from the timer 402 shown in FIG. 4. The power supply is started, via step 802. The system then waits for the stabilization of the power supply, via step 804. The CPU is then interrupted via step 808, and DRAM is restored to normal load via step 810.

It is then determined what caused the wakeup, via step 812. If something other than the timer, such as the user, caused the wakeup, it is then determined whether the digital camera is in the middle of performing a timelapse sequence, via step 816. Step 816 can be determined by determining whether the timer is running. If a timelapse sequence is not being performed, then normal operations can proceed. If, however, a timelapse sequence is being performed, then the timelapse state is retrieved, via step 814.

Likewise, if the timer caused the wakeup via step 812, then the timelapse state is retrieved, via step 814. The timelapse is then continued, via step 818. Once an image is captured, and it is determined that that capture is not the last image via step 833, then a normal timelapse shutdown is performed via step 824, i.e., sleep is initiated. A deep sleep sequence is initiated via step 828.

If the last image is captured via step 833, and the processing is complete, then normal shutdown is performed, via step 822. Normal shutdown can include a period of sleep mode followed by power-off, or simply power-off.

If the digital camera is powered down by the user, then it is determined whether there is enough time left before the next capture, via step 826. If there is not time left before the next capture to sleep, then a warning is displayed for the user via step 832 and step 818 continues. Note that the user can abort the time-lapse sequence during step 818. Otherwise, the normal timelapse shut down is performed via step 830, and deep sleep sequence is initiated via step 828.

If it is determined to abort the timelapse sequence, then timelapse sequence is exited via step 834.

Figure 9:
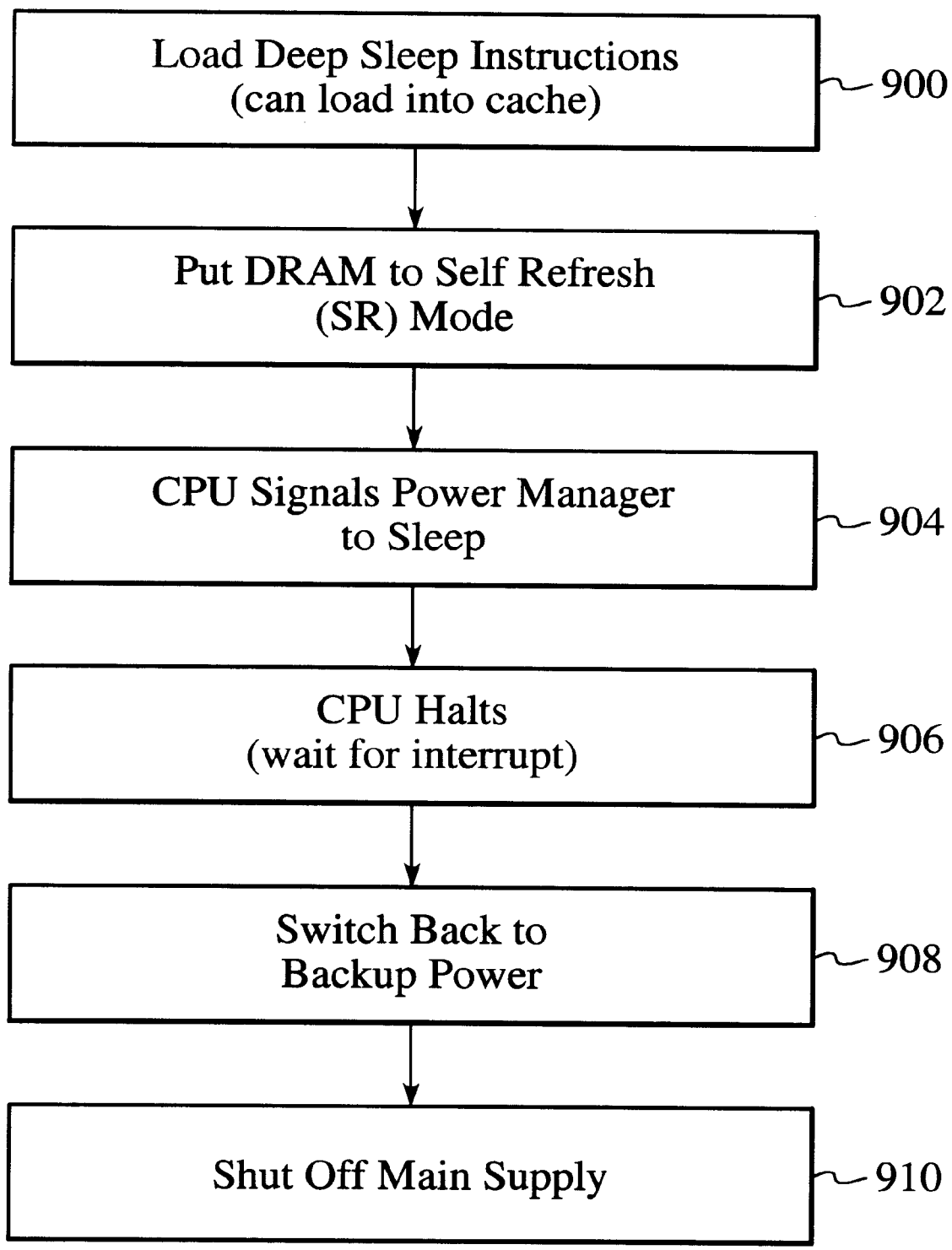
FIG. 9 is a flow diagram of the deep sleep sequence of the method according to the present invention shown in FIG. 8.

FIG. 9 is a flow diagram of the deep sleep sequence 828 shown in FIG. 8. When deep sleep is initiated, deep sleep instructions are loaded, for instance into a cache, via step 900, because commands cannot be executed from the ROM until main power is restored. The DRAM is placed into self refresh (SR) mode, via step 902. The CPU signals the power manager to sleep, via step 904. The CPU then halts, waiting for an interrupt, via step 906. The digital camera system is then switched back to backup power via step 908, and the main power supply is then shut off, via step 910.

A method and system for automatic timelapse capture in an image capture unit has been disclosed. Software written according to the present invention is to be stored in some form of computer-readable medium, such as memory or CD-ROM, or transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for time lapse capture in an image capture unit, the method comprising:

allowing the image capture unit to be placed in a time lapse sequence;

capturing a first image;

automatically initiating a sleep mode after capturing the first image if the image capture unit is in the time lapse sequence; and automatically transitioning from the sleep mode into a wake mode prior to capturing a second image if the image capture device is in the time lapse sequence.

2. The method of claim 1, wherein the sleep mode is initiated when a predetermined time interval is greater than a sum of a processing time and a setup time.

3. The method of claim 1, wherein the sleep mode is not initiated when a predetermined time interval is not greater than a sum of a processing time and a setup time.

4. The method of claim 1, wherein the step of transitioning further includes booting up a processor.

5. The method of claim 1, further comprising a step of determining whether the time lapse sequence is being performed after the step of transitioning.

6. The method of claim 1, wherein the step of transitioning further includes restoring a memory to normal operation.

7. The method of claim 1, wherein the sleep mode is a deep sleep.

8. A method for time lapse capture in an image capture unit, the method comprising:

allowing the image capture unit to be placed in a time lapse sequence;

determining if a predetermined time interval is greater than a sum of a processing time and setup time, the predetermined interval being a capture interval;

automatically initiating a sleep mode if the predetermined time interval is greater than the sum of the processing time and the setup time and if the image capture unit is in the time lapse sequence; and automatically transitioning from the sleep mode to a wake up mode prior to capturing an image if the image capture device is in the time lapse sequence.

9. The method of claim 8, further comprising a step of capturing a first image prior to the step of determining.

10. The method of claim 8, wherein the sleep mode is not initiated when a predetermined time interval is not greater than a sum of a processing time and a setup time.

11. The method of claim 8, wherein the step of transitioning further includes booting up a processor.

12. The method of claim 8, further comprising a step of determining whether the time lapse sequence is being performed after the step of transitioning.

13. The method of claim 8, wherein the step of transitioning further includes restoring a memory to normal load.

14. The method of claim 8, wherein the sleep mode is a deep sleep.

15. A system for time lapse capture in an image capture unit, the system comprising:

a processor;

a timer coupled to the processor, the timer notifying the processor when a predetermined time interval has completed prior to an image capture; and a switch coupled to the processor, the switch operating in one of two modes, wherein a first mode is a normal operation mode, and a second mode is a sleep mode;

wherein the switch automatically transitions from the first mode to the second mode after the image capture is completed if the image capture unit is in a time lapse sequence and automatically transitions from the second mode to the first mode when the predetermined time interval has completed if the image capture unit is in the time lapse sequence.

16. The system of claim 15, further comprising a power manager coupled to the processor and the timer, wherein the timer sends a signal to the power manager notifying the power manager that the predetermined time interval has completed.

17. The system of claim 15, wherein the processor determines if the predetermined time interval is greater than a sum of a processing time and a setup time.

18. The system of claim 17, wherein the switch operates in the sleep mode if the predetermined time interval is greater than the sum of the processing time and the setup time.

19. The system of claim 17, wherein the sleep mode is not initiated when the predetermined time interval is not greater than the sum of the processing time and the setup time.

20. The system of claim 17, wherein the processor boots up when the switch transitions from the second mode to the first mode.

21. The system of claim 17, wherein the a memory is restored to normal load when the switch transitions from the second mode to the first mode.

22. The system of claim 17, wherein the sleep mode is a deep sleep.

* * * * *